(12) United States Patent
Sohn et al.

(10) Patent No.: US 10,447,329 B2
(45) Date of Patent: Oct. 15, 2019

(54) METHOD AND DEVICE FOR PROCESSING UPLINK DATA IN COMMUNICATION SYSTEM

(71) Applicant: Samsung Electronics Co., Ltd., Gyeonggi-do (KR)

(72) Inventors: Dae Ho Sohn, Gyeonggi-do (KR); Byungjoon Park, Seoul (KR); Hayoung Yang, Gyeonggi-do (KR); Yusuk Yun, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/765,433

(22) PCT Filed: Sep. 28, 2016

(86) PCT No.: PCT/KR2016/010846
§ 371 (c)(1),
(2) Date: Apr. 2, 2018

(87) PCT Pub. No.: WO2017/057897
PCT Pub. Date: Apr. 6, 2017

(65) Prior Publication Data
US 2018/0287655 A1    Oct. 4, 2018

(30) Foreign Application Priority Data
Oct. 1, 2015 (KR) .................. 10-2015-0138641

(51) Int. Cl.
*H04B 1/40* (2015.01)
*H04W 76/00* (2018.01)
(Continued)

(52) U.S. Cl.
CPC ............... *H04B 1/40* (2013.01); *H04B 7/08* (2013.01); *H04W 76/00* (2013.01); *H04W 88/085* (2013.01)

(58) Field of Classification Search
CPC ............... H04B 1/40; H04B 3/04; H04B 3/32
(Continued)

(56) References Cited

U.S. PATENT DOCUMENTS

2005/0105552 A1* 5/2005 Osterling ............ H04W 88/085
370/466
2010/0220712 A1    9/2010 Zhang et al.
(Continued)

FOREIGN PATENT DOCUMENTS

| WO | WO 2013022166 | 2/2013 |
| WO | WO 2014010794 | 1/2014 |
| WO | WO 2014017704 | 1/2014 |

OTHER PUBLICATIONS

PCT/ISA/210 Search Report issued on PCT/KR2016/010846 (pp. 3).
PCT/ISA/237 Written Opinion issued on PCT/KR2016/010846 (pp. 8).

*Primary Examiner* — Lee Nguyen
(74) *Attorney, Agent, or Firm* — The Farrell Law Firm, P.C.

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). A method of operating a first Radio Unit (RU) for transmitting an uplink signal in a communication system of the present disclosure includes receiving a first signal through an antenna, re-compensating a second signal delivered from a second RU through a transmission line by using a re-compensation factor, compensating a third signal obtained by adding the first signal and the re-compensated second signal by using a compensation factor, and delivering the compensated third signal to a higher-level RU or a Digital Unit (DU).

20 Claims, 7 Drawing Sheets

(51) Int. Cl.
  *H04B 7/08* (2006.01)
  *H04B 1/44* (2006.01)
  *H04W 88/08* (2009.01)

(58) Field of Classification Search
  USPC .................................................. 370/229–235
  See application file for complete search history.

(56) References Cited

U.S. PATENT DOCUMENTS

| | | |
|---|---|---|
| 2011/0128950 A1 | 6/2011 | Tomita et al. |
| 2011/0236024 A1 | 9/2011 | Mao |
| 2011/0237178 A1 | 9/2011 | Seki et al. |
| 2014/0328224 A1 | 11/2014 | Lee et al. |

* cited by examiner

METHOD AND DEVICE FOR PROCESSING UPLINK DATA IN COMMUNICATION SYSTEM

PRIORITY

This application is a National Phase Entry of PCT International Application No. PCT/KR2016/010846, which was filed on Sep. 28, 2016, and claims priority to Korean Patent Application No. 10-2015-0138641, which was filed on Oct. 1, 2015, the contents of each of which are incorporated herein by reference.

TECHNICAL FIELD

The present disclosure relates to uplink data processing of a radio unit in a communication system.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'. The 5G communication system is considered to be implemented in higher frequency (mm-Wave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.
In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.
In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A communication system consisting of a cascade chain topology may include a Digital Unit (DU) and a plurality of Radio Units (RUs). A RU located in a specific hop generates uplink data by adding data received from its antenna and data received from a RU of a lower-level hop. In addition, the uplink data is transmitted to a RU of a higher-level hop or the DU. Herein, when the uplink data is transmitted to the higher-level hop or the DU, data received from the RU of the lower-level hop and data received from its antenna are accumulated, thereby gradually increasing an amount of data. The number of transmittable valid bits is limited in a transmission line due to physical or economic constraints. Therefore, in a specific hop, the number of valid bits of the accumulated data may exceed the number of bits that can be transmitted on the transmission line. In this case, data may be transmitted with distortion when the uplink data is transmitted to the RU of the higher-level hop or the DU. As a result, distortion of an uplink signal to be transmitted may increase in proportion to an increase in the number of RUs in a communication system coupled with a cascade chain.

To solve this problem, each RU transmits data to a higher-level entity by decreasing an amount of received data, so as not to exceed the number of bits that can be transmitted on the transmission line. In this case, since uplink data is accumulated and transmitted when the hop of the RU is located close to the DU, a decrement level of the uplink data changes depending on the location of the RU. Accordingly, there is a problem in that transmission cannot be achieved while maintaining the same decrement amount for each RU having a different hop location.

DETAILED DESCRIPTION OF THE INVENTION

Technical Problem

An embodiment of the present disclosure provides an apparatus and method for transmitting uplink data of a Radio Unit (RU) in a communication system.

An embodiment of the present disclosure provides an apparatus and method for re-compensating a received uplink signal of a RU in a communication system.

An embodiment of the present disclosure provides an apparatus and method for compensating an uplink signal to be transmitted to a higher-level RU of a RU in a communication system.

An embodiment of the present disclosure provides an apparatus and method for identifying a compensation factor and re-compensation factor of a digital unit in a communication system.

Technical Solution

According to an embodiment of the present disclosure, a method of operating a first RU in a communication system includes receiving a first signal through an antenna, re-compensating a second signal delivered from a second RU through a transmission line by using a re-compensation factor, compensating a third signal obtained by adding the first signal and the re-compensated second signal by using a compensation factor, and delivering the compensated third signal to a higher-level RU or a Digital Unit (DU).

According to an embodiment of the present disclosure, a first RU apparatus includes a first communication unit configured to receive a first signal, and a processor configured to re-compensate a second signal delivered from a second RU through a transmission line by using a re-compensation factor, and compensate a third signal obtained by adding the first signal and the re-compensated second signal by using a compensation factor. The first communication unit delivers the compensated third signal to a higher-level RU or a DU.

According to an embodiment of the present disclosure, a method of operating a DU in a communication system includes identifying a compensation factor and re-compensation factor corresponding to each RU on a cascade chain coupled to the DU through a transmission line, and transmitting the compensation factor and the re-compensation factor to the each RU.

According to an embodiment of the present disclosure, a DU apparatus in a communication system includes a factor identification unit configured to identify a compensation factor and re-compensation factor corresponding to each RU on a cascade chain coupled to the DU through a transmission line, and a communication unit configured to transmit the compensation factor and the re-compensation factor to the each RU.

Advantageous Effects

In a communication system, each RU can compensate and re-compensate an uplink signal by using a compensation factor and a re-compensation factor. A signal transmitted to a higher-level RU and/or a DU through a transmission line can be prevented from distortion by performing compensation and re-compensation of the uplink signal.

MODE FOR CARRYING OUT THE INVENTION

The present disclosure will be described herein below with reference to the accompanying drawings. In the following description, well-known functions or constructions are not described in detail since they would obscure the disclosure in unnecessary detail. Also, the terms used herein are defined according to the functions of the present disclosure. Thus, the terms may vary depending on user's or operator's intension and usage. That is, the terms used herein must be understood based on the descriptions made herein.

Terms referring to constitutional elements of a device, elements constituting a communication system, or the like in the following description are exemplified for convenience of explanation. Therefore, the present disclosure is not limited to the terms described below, and other terms having identical technical meanings may also be used.

Hereinafter, the present disclosure describes a technique for transmitting uplink data of Radio Units (RUs), which are constructed of a multi-hop constituting a cascade chain structure in a communication system, to a Digital Unit (DU) without distortion. Herein, the DU may be referred to as a Base Band Unit (BBU).

In the communication system including the plurality of RUs coupled to the DU through a cascade chain, the RUs may play a role of extending communication coverage of a base station. That is, each RU on the cascade chain may be in charge of independent coverage. Accordingly, the coverage of the base station may increase in proportion to an increase in the RU. Data transmission/reception between the RUs or between the RU and the DU may be achieved in a wired communication manner though a transmission line. When the signal is transmitted/received through the transmission line, the number of transmittable valid bits may be limited. The limitation on the number of valid bits may be not a big problem when a signal is transmitted from a relatively lower-level RU on the cascade chain to an adjacent higher-level RU. However, in case of the relatively higher-level RU on the cascade chain, there may be a problem in that a size of a signal to be transmitted exceeds maximum transmission capacity of the transmission line due to accumulation of data received through an antenna of each RU.

To solve this problem, each RU on the cascade chain may perform transmission after performing compensation such that the number of valid bits of a signal obtained by adding a signal received from an antenna and uplink data received from a lower-level RU does not exceed the number of transmittable bits of the transmission line. Herein, the compensation implies a computation or operation of decreasing the number of bits for representing a signal by decreasing a signal size through scaling. In addition, an adjacent higher-level RU may re-compensate a compensated and received uplink signal to restore it to an original signal, thereby preventing the uplink signal from being distorted. Herein, the re-compensation implies a computation or operation of restoring a signal compensated in the lower-level RU to an original size. Accordingly, even if the number of RUs increases, the distortion is not accumulated, and the same scaling factor may be maintained in an uplink signal received in each RU.

Figure 1:
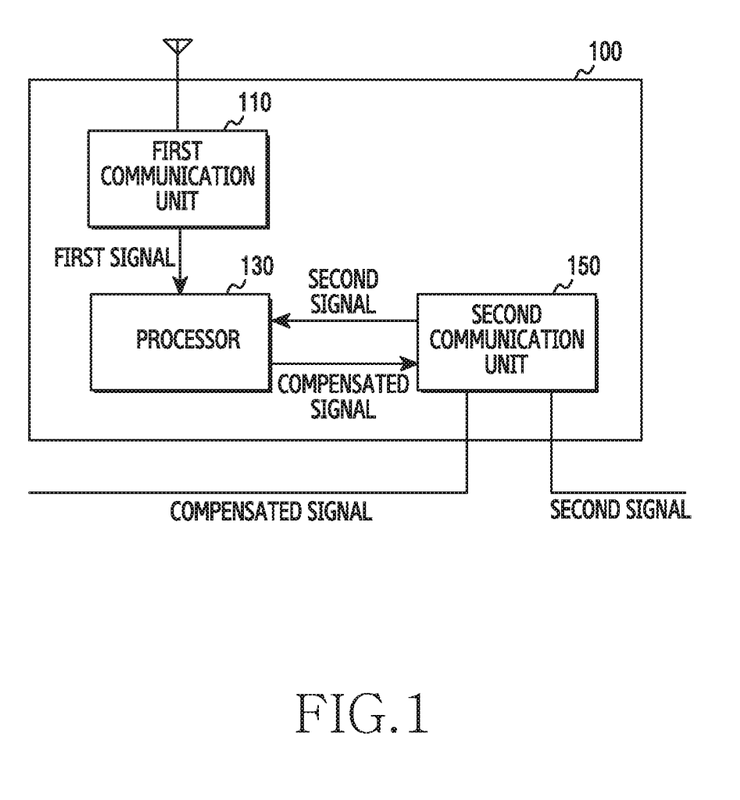
FIG. 1 shows a Radio Unit (RU) in a communication system constituting a cascade chain structure according to an embodiment of the present disclosure.

FIG. 1 shows a RU 100 in a communication system constituting a cascade chain structure according to an embodiment of the present disclosure. Although one RU is illustrated in FIG. 1, a plurality of RUs may be coupled in the cascade chain structure. The plurality of RUs may constitute one base station through a wired connection with a DU. The RU 100 may be referred to as a Radio Remote Head (RRH). The RU 100 may transmit and receive a signal with respect to an electronic device through a wireless channel.

Referring to FIG. 1, the RU 100 includes a first communication unit 110 in charge of wireless communication and a second communication unit 150 in charge of wired communication through a transmission line between RUs. In addition, a processor 130 is included to re-compensate a second signal received from the second communication unit 150 and compensate an uplink signal to be transmitted to a higher-level RU.

Specifically, the first communication unit 110 may transmit/receive a signal with respect to an electronic device in a coverage area of the RU 100 through wireless communication. The first communication unit 110 may include one or more antennas for wireless communication. According to an embodiment of the present disclosure, the first communication unit 110 may receive an uplink signal from the electronic device in the coverage area of the RU 100. For the purpose of explanation, a signal received by using the first communication unit may be referred to as a first signal. The first communication unit 110 may deliver the first signal to the processor 130.

The second communication unit 150 may receive a signal from an adjacent lower-level RU of the RU 100 in a wired communication manner through a transmission line. The lower-level RU implies a RU located farther from a DU than the RU 100 on the cascade chain. For the purpose of explanation, a signal received by using the second communication unit may be referred to as a second signal. In addition, the second communication unit 150 may transmit a signal compensated in the processor 130 to the higher-level RU in a wired communication manner through the transmission line. Herein, the higher-level RU implies a RU located closer to the DU than the RU 100. The second communication unit 150 may deliver the second signal to the processor 130.

The processor 130 may generate a compensated signal by using the first signal received from the first communication unit 110 and the second signal received from the second communication unit. Specifically, the processor 130 may re-compensate the second signal by using a re-compensation factor. Herein, the re-compensation implies a computation or operation of restoring a signal compensated in the lower-level RU to an original size. A transmission line which connects the cascade chain may have a limited number of transmittable valid data bits due to physical or economic constraints. Therefore, the second signal received from the adjacent lower-level RU may be delivered to the RU 100 in a state of being compensated for transmission efficiency. Herein, the compensation implies a computation or operation of decreasing the number of bits for representing a signal by decreasing a signal size through scaling. Therefore, the processor 130 may re-compensate the received second signal by using the re-compensation factor to restore it to an original signal. Thereafter, the processor 130 may add the re-compensated second signal and the first signal. In addition, the added signal may be compensated by using the compensation factor of the RU 100. The compensated signal generated in the processor 130 may be delivered to the second communication unit so as to be transmitted to the adjacent higher-level RU in a wired communication manner through the transmission line.

By using a method in which the second signal transmitted in the adjacent lower-level RU is re-compensated and thereafter is added to the first signal, compensation may be achieved based on the same scale for each signal in the compensation process. That is, the re-compensated signal implies an original signal. In addition, the first signal received by using the first communication unit also implies the original signal. Therefore, compensation for the added signal of the re-compensated signal and the first signal implies compensation for the original signal. Therefore, all signals may be transmitted by maintaining the same decrement amount in each RU.

Figure 2:
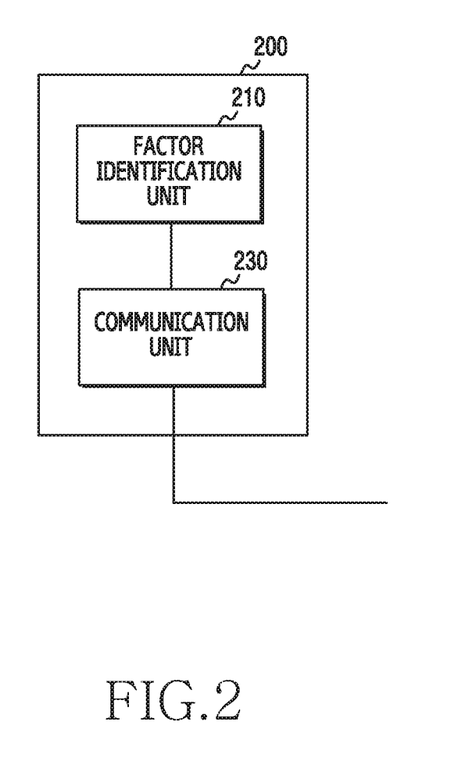
FIG. 2 illustrates a Digital Unit (DU) in a communication system constituting a cascade chain structure according to an embodiment of the present disclosure.

FIG. 2 illustrates a DU in a communication system constituting a cascade chain structure according to an embodiment of the present disclosure. A DU 200 may be coupled to a plurality of RUs in the cascade chain structure through a transmission line. The DU 200 and the plurality of RUs may constitute one base station. The DU 200 may perform functions such as data modulation/decoding, channel encoding/decoding, scheduling, digital signal processing, or the like.

Referring to FIG. 2, the DU 200 includes a factor identification unit 210 for identifying a compensation factor and re-compensation factor of each RU located in a corresponding hop on a cascade chain. In addition, a communication unit 230 is included to communicate with a RU on the cascade chain in a wired communication manner through the transmission line. Although not shown in FIG. 2, the DU 200 may further include another communication unit in charge of wireless communication.

Specifically, the factor identification unit 210 may identify the compensation factor and re-compensation factor of the RU according to a location of each hop in the communication system having the cascade chain structure. Herein, the compensation implies a computation or operation of decreasing the number of bits for representing a signal by decreasing a signal size through scaling. In addition, the re-compensation implies a computation or operation of restoring a signal compensated in a lower-level RU to an original size. For example, it may be assumed a case where one DU 200 and n RUs are coupled with the cascade chain in the communication system. Herein, when it is defined such that a RU located in a hop nearest to the DU 200 is denoted by 100-(1), a RU located in a next hop is denoted by 100-(2), and the like, then up to a RU 100-(n) may be defined. In addition, a compensation factor of the RU 100-(1) may be defined as $1/S_1$, a compensation factor of the RU 100-(2) may be defined as $1/S_2$, and a compensation factor of the RU 100-(3) may be defined as $1/S_3$, and in this manner, a compensation factor of the RU 100-(n) may be defined as $1/S_n$. According to a characteristic in which the RU 100-(n) is located in a hop farthest from the DU, an amount of data transmitted to the RU 100-(n−1) through the transmission line may be small. Alternatively, according to a characteristic of being located in a hop nearest to the DU, the RU 100-(1) may have a greatest amount of data to be transmitted to the DU through the transmission line. This is because data received by using the first communication unit, i.e., an antenna, included in each RU may be added in a process of transmitting uplink data to the higher-level RU. Therefore, the compensation factor $1/S_n$ corresponding to the RU 100-(n) may be the greatest of all compensation factors. This implies that a signal transmitted through the transmission line may decrease in size to the minimum extent. On the contrary, the compensation factor $1/S_1$ corresponding to the RU 100-(1) may be the smallest of all compensation factors. This implies that the signal transmitted through the transmission line may decrease in size to the maximum extent.

According to an embodiment, the compensation factor corresponding to each RU may be a fixed value. According to another embodiment, the compensation factor corresponding to each RU may vary depending on a change in the number of RUs on the cascade chain. For example, when the number of RUs increases from n to n+1 for a reason such as additional installation of the RU, values $1/S_1$ to $1/S_n$ may further decrease. This is because data received through coverage served by the RU 100-(n+1) may be added. Therefore, it may be required to further decrease a size of a signal transmitted through the transmission line. On the contrary, when the number of RUs on the cascade chain decreases from n to n−1, the values $1/S_1$ to $1/S_n$ may further increase. According to another embodiment, when there is a change in transmission capacity of the transmission line, the identified compensation factor corresponding to each RU may correspondingly change together. For example, when the transmission capacity of the transmission line increases for a physical reason (e.g., an increase in a bandwidth of the transmission line), the values $1/S_1$ to $1/S_n$ of the compensation factors may be greater than the value before the change. That is, this implies that the size of the signal transmitted through the transmission line decreases to a smaller extent. On the contrary, when the transmission capacity decreases during a unit time of the transmission line, the values $1/S_1$ to $1/S_n$ of the compensation factors may be smaller than the value before the change. That is, this implies that the size of the signal transmitted through the transmission line decreases to a greater extent. For another example, when an amount of data transmitted/received through the transmission line decreases, the values $1/S_1$ to $1/S_n$ of the compensation factors may increase. That is, the size of the signal to be transmitted/received may decrease to a smaller extent. On the contrary, when the amount of data transmitted/received through the transmission line increases, the values $1/S_1$ to $1/S_n$ of the compensation factors may increase. That is, the size of the signal to be transmitted/received may increase to a greater extent.

The factor identification unit 210 may identify a re-compensation factor of each RU on the basis of the identified compensation factor. The re-compensation factor is to re-compensate a compensated signal received through the transmission line in a state of being compensated in the lower-level RU. That is, this is to re-compensate the compensated and transmitted signal to an original signal. The re-compensation factor of each RU is related to the compensation factor of the RU located in the adjacent lower-level hop. For example, in case of the compensation factor $1/S_k$ of the RU 100-($k$), the re-compensation factor of the RU 100-($k$-1) may be $S_k$. More specifically, if the compensation factor of the RU 100-(4) is $1/S_4$, the re-compensation factor of the RU 100-(3) may be $S_4$. That is, the original signal is restored by re-compensating the signal as much as it is compressed during transmission.

The DU 200 may identify its re-compensation factor by using the factor identification unit 210. This is to re-compensate a signal received in a state of being compensated from the RU 100-(1) located in a highest-level hop closest to the DU 200 to an original signal. Therefore, when the compensation factor of the RU 100 (1) is $1/S_1$, the re-compensation factor of the DU 200 may be $S_1$. That is, a signal compensated by $1/S_1$ through the transmission line is restored again by $S_1$, thereby restoring it to an original signal. Through the above process, the DU 200 may receive an uplink signal from each RU without distortion.

In addition, the DU 200 may also include the communication unit 230. The communication unit 230 may be in charge of wired communication with a RU located in each hop of the cascade chain through the transmission line. The DU 200 may receive a signal in a wired communication manner through the transmission line from the RU 100-(1) located in the highest-level hop by using the communication unit 230. Herein, the signal received from the RU 100-(1) implies a signal collected from all RUs according to the cascade chain structure. The communication unit 230 may transmit to each RU the compensation factor and re-compensation factor, which are identified by the factor identification unit 210, for each RU in a wired communication manner through the transmission line. According to the cascade chain connection structure of each RU, the compensation factor and re-compensation factor for each RU will be transmitted sequentially from the RU 100-(1) to the RU 100-($n$). In addition, when the compensation factor and re-compensation factor of each RU change for a reason of a change in the total number of RUs on the cascade chain, a physical change of the transmission line, or the like, the communication unit 230 may sequentially transmit the changed compensation factor and re-compensation factor to each RU.

Figure 3:
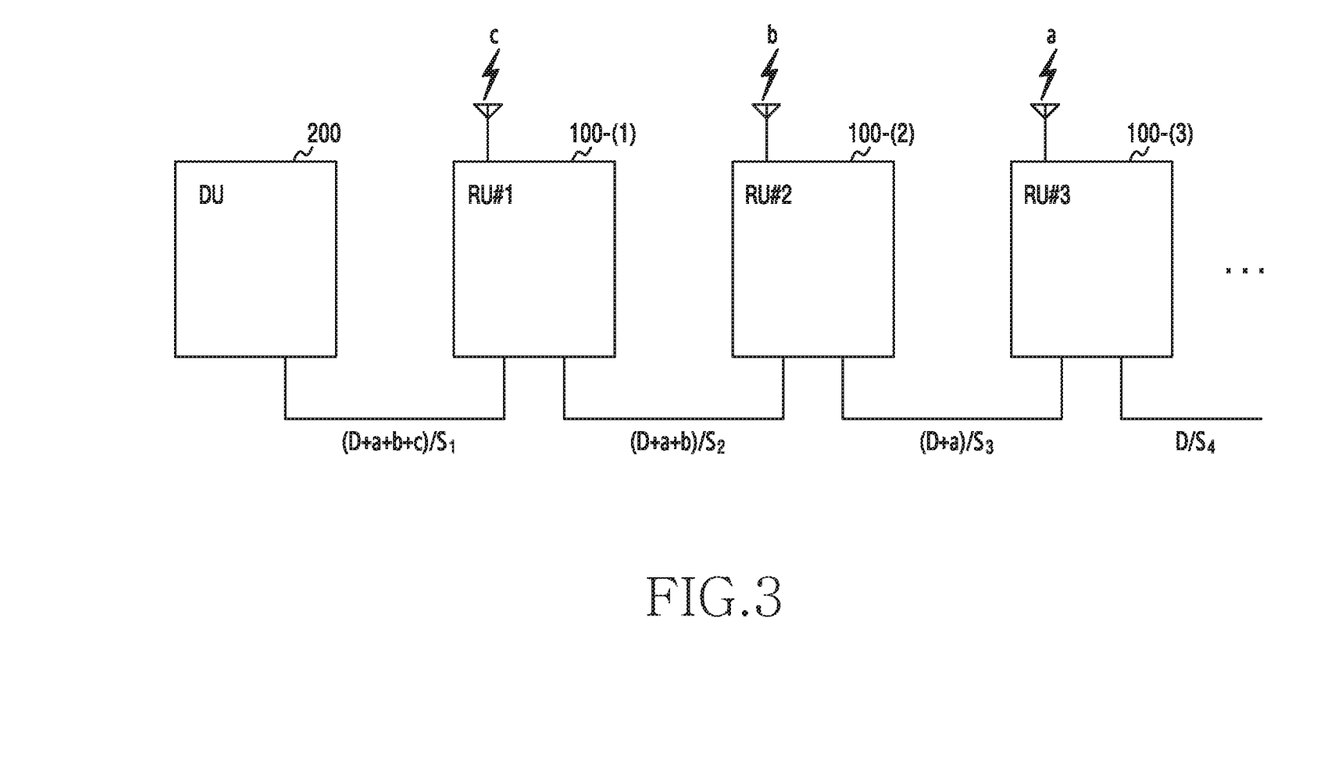
FIG. 3 illustrates a communication system including a DU and a plurality of RUs which are coupled in a cascade chain structure according to an embodiment of the present disclosure.

FIG. 3 illustrates a communication system including a DU and a plurality of RUs which are coupled in a cascade chain structure according to an embodiment of the present disclosure. Although one DU 200 and three RUs 100-(1) to 100-(3) are shown in FIG. 3, this is only for convenience of explanation. It is assumed in FIG. 3 that n RUs are coupled in the cascade chain structure.

Referring to FIG. 3, the RU 100-(3) is not explicitly shown in FIG. 3, and may receive an uplink signal from the RU 100-(4), of which structure is omitted, through a transmission line. This may be achieved by using a second communication unit included in the RU 100-(3). For example, as shown in FIG. 3, the RU 100-(3) may receive a compensated signal $D/S_4$ from the RU 100-(4). Herein, $1/S_4$ represents a compensation factor of the RU 100-(4), and D denotes an original signal collected by means of the RU 100-(4) to the RU 100-($n$). A re-compensation factor of the RU 100-(3) may be $S_4$ which is a reciprocal of the compensation factor of the RU 100-(4). The RU 100-(3) may restore the original signal D by using its re-compensation factor $S_4$ with respect to the received compensated signal $D/S_4$. Further, the RU 100-(3) may add a signal 'a' received in a wireless communication manner by using the first communication unit with the re-compensated and restored signal D. In addition, the added signal D+a may be compensated to be transmitted to the RU 100-(2) through the transmission line. Since a compensation factor of the RU 100-(3) is $1/S_3$, a signal compensated in the RU 100-(3) may be a signal (D+a)/$S_3$. Herein, the compensation and re-compensation factors may be identified based on the number of RUs and capacity (or a data amount) of the transmission line, such that the number of valid bits of the compensated signal (D+a)/$S_3$ does not exceed maximum transmission capacity of the transmission line.

The RU 100-(2) may receive the compensated signal (D+a)/$S_3$ from the RU 100-(3) by using the second communication unit in the same manner. The RU 100-(2) may re-compensate the signal (D+a)/$S_3$ by using the re-compensation factor. The re-compensation factor of the RU 100-(2) may be $S_3$ which is a reciprocal of the compensation factor of the RU 100-(3). Therefore, the re-compensated signal may be a signal D+a. The RU 100-(2) may re-compensate a signal 'b' received in a wireless communication manner by using the first communication unit and may add it to the restored signal D+a. In addition, the combined signal D+a+b may be compensated to be transmitted to the RU 100-(1) through the transmission line. Since a compensation factor of the RU 100-(2) is $1/S_2$, a signal compensated in the RU 100-(2) may be a signal (D+a+b)/$S_2$. Herein, the compensation and re-compensation factors may be pre-set based on the number of RUs and capacity of the transmission line, such that the number of valid bits of the compensated signal (D+a+b)/$S_2$ does not exceed maximum transmission capacity of the transmission line.

The RU 100-(1) may receive the compensated signal (D+a+b)/$S_2$ from the RU 100-(3) by using the second communication unit in the same manner. The RU 100-(1) may re-compensate the signal (D+a+b)/$S_2$ by using the re-compensation factor. The re-compensation factor of the RU 100-(1) may be $S_2$ which is a reciprocal of the compensation factor of the RU 100-(2). Therefore, the re-compensated signal may be a signal D+a+b. The RU 100-(1) may re-compensate a signal 'c' received in a wireless communication manner by using the first communication unit and may add it to the restored signal D+a+b. In addition, the added signal D+a+b+c may be compensated to be transmitted to the DU 200 through the transmission line. Since a compensation factor of the RU 100-(1) is $1/S_1$, a signal compensated in the RU 100-(1) may be a signal (D+a+b+c)/$S_1$. Herein, the compensation and re-compensation factors may be pre-set based on the number of RUs and capacity of the transmission line, such that the number of valid bits of the compensated signal (D+a+b+c)/$S_1$ does not exceed maximum transmission capacity of the transmission line.

The DU 200 may receive the compensated signal (D+a+b+c)/$S_1$ from the RU 100-(1) by using the communication unit 230. This may be achieved in a wireless communication manner through the transmission line. The DU 200 may re-compensate the received compensated signal (D+a+b+c)/$S_1$ by using the re-compensation factor to restore it to an original signal. The re-compensation factor of the DU 200 is identical to a reciprocal of the compensation factor of the RU 100-(1). That is, the re-compensation factor of the DU 200 may be $S_1$. In addition, the DU 200 may identify the compensation/re-compensation factor of each RU on the cascade chain by using the factor identification unit 210 and transmit it to each RU in a wired communication manner through the transmission line.

A relationship between the compensation factor and the re-compensation factor in the communication system of the present disclosure is summarized as follows. A re-compensation factor of a specific RU is identical to a reciprocal of a compensation factor of a RU located in an adjacent lower-level hop. For example, if it is assumed that a compensation factor of the RU 100-$k$ is $1/S_k$, a re-compensation factor of the RU 100-($k-1$) may be its reciprocal, i.e., $S_k$.

In addition, a size of a compensated signal delivered through the transmission line may be summarized by Equation (1) below.

$$RU\_UL_n = 1/S_n \times (UL\_ANT_n + S_{n+1} \times RU\_UL_{n+1}) \qquad (1)$$

Herein, n denotes a number indicating a location of each RU, and $RU\_UL_n$ denotes an uplink signal (i.e., a compensated signal) to be transmitted from each RU to a higher-level RU or a DU. Further, $UL\_ANT_n$ denotes an uplink signal received from a first communication unit, i.e., an antenna, of each RU. $1/S_n$ denotes a compensation factor of each RU. The compensation factor and re-compensation factor of each RU may be identified by considering a location of a hop of each RU and capacity of the transmission line, such that $RU\_UL_n$ does not exceed maximum transmission capacity of the transmission line.

Figure 4:
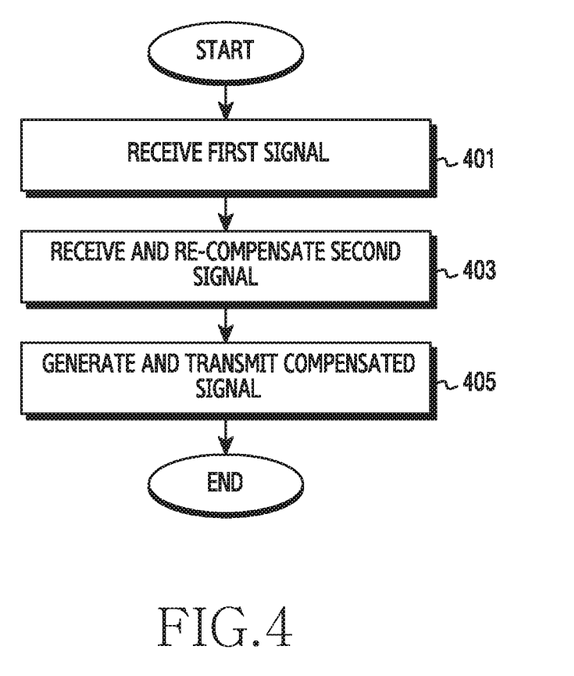
FIG. 4 is a flowchart illustrating an operation of a RU according to an embodiment of the present disclosure.

FIG. 4 is a flowchart illustrating an operation of the RU 100 according to an embodiment of the present disclosure. Herein, the RU 100 implies one RU located in a specific hop in a cascade chain structure in which a plurality of RUs are serially coupled. The RU 100 may be coupled to a RU located in an adjacent lower-level hop and a RU located in an adjacent higher-level hop or a DU through a transmission line.

Referring to FIG. 4, in step 401, the RU 100 may receive a signal by using the first communication unit 110. Specifically, the first communication unit 110 may include one or more antennas. The RU 100 may receive data in a wireless communication manner. That is, the RU 100 may receive uplink data from a terminal, electronic device, or the like located in coverage served by the RU 100 in a wireless communication manner by using the first communication unit 110.

In step 403, the RU 100 may receive a second signal. Specifically, the RU 100 may receive a compensated signal from a RU located in an adjacent lower-level hop. Herein, the compensation implies a computation or operation of decreasing the number of bits for representing a signal by decreasing a signal size through scaling. For example, if the RU 100 is located in an $n^{th}$ hop from the DU 200, the RU 100 may receive a compensated signal from a RU located in an $(n+1)^{th}$ hop. Herein, the compensated signal implies a signal compensated such that a signal transmitted through the transmission line does not exceed transmission capacity of the transmission line. The RU 100 may re-compensate the received second signal by using the re-compensation factor. Herein, the re-compensation implies that a compensated signal received from the RU located in the $(n+1)^{th}$ hop is restored to an original signal. As described above, the re-compensation factor of the RU located in the $n^{th}$ hop and the compensation factor of the RU located in the $(n+1)^{th}$ hop may have a reciprocal relationship. Therefore, when it is assumed that the compensation factor of the RU located in the $(n+1)^{th}$ hop is $1/S_{n+1}$, the re-compensation factor of the RU 100 located in the $n^{th}$ hop may be $S_{n+1}$, which is a reciprocal of $1/S_{n+1}$. The RU 100 may re-compensate a signal received from the lower-level hop by using the re-compensation factor $S_{n+1}$ to generate a re-compensated signal.

In operation 405, the RU 100 may generate a compensated signal to be transmitted to the RU located in the higher-level hop or the DU 200 in the 405 operation. Specifically, the RU 100 may add the first signal received in a wireless communication manner by using the first communication unit in step 401 and the signal re-compensated in step 403. Herein, the re-compensated signal may imply an original signal. A size of the added signal may be estimated differently depending on a location of the hop of the RU 100. That is, the closer the location of the hop of the RU 100 to the DU, the greater the size of the added signal. This is because signals received by using the first communication unit (e.g., antenna) included in each RU are added and accumulated in a process in which a signal is transmitted toward the DU from a RU located in a lower-level hop. Therefore, the number of valid bits of the added signals may exceed maximum transmission capacity of the transmission line. Therefore, the RU 100 must first compensate the added signal to transmit it to a RU located in an adjacent higher-level hop. The compensation factor of the RU 100 may be identified by considering the location of the hop of the RU 100 and maximum transmission capacity (or data size) of the transmission line. The RU 100 may compensate the added signal by using its compensation factor. In addition, the compensated signal may be transmitted to the adjacent higher-level RU or the DU through the transmission line.

In the above embodiment, it is described that the first signal is received first, and thereafter the second signal is received and re-compensated. However, this is not a limitation of the embodiment, and thus it is also possible to consider an embodiment in which the second signal is received and re-compensated first, and thereafter the first signal is received. Alternatively, it is also possible to consider an embodiment in which the RU 100 simultaneously performs an operation of receiving the first signal and an operation of receiving and re-compensating the second signal.

Figure 5:
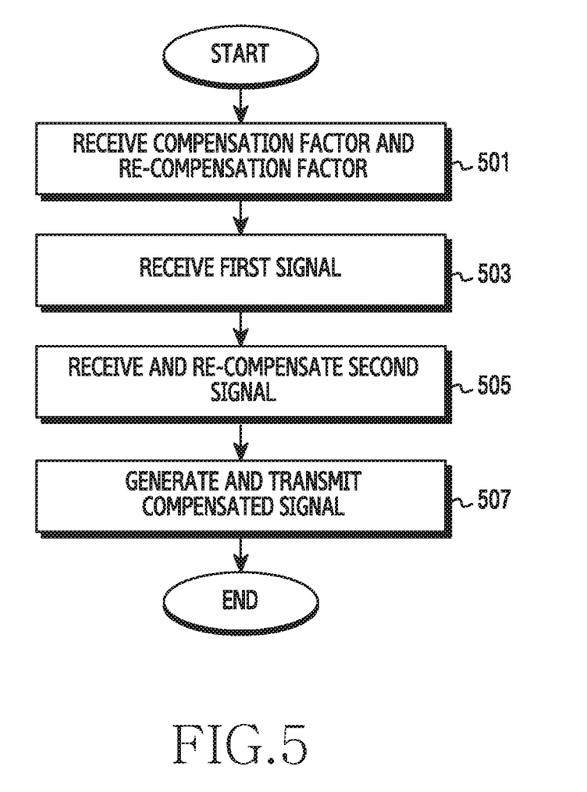
FIG. 5 is a flowchart illustrating an operation of a RU according to an embodiment of the present disclosure.

FIG. 5 is a flowchart illustrating an operation of the RU 100 according to an embodiment of the present disclosure. Herein, the RU 100 implies one RU located in a specific hop in a cascade chain structure in which a plurality of RUs are serially coupled. The RU 100 may be coupled to a RU located in a lower-level hop and a RU located in a higher-level hop or a DU through a transmission line.

Referring to FIG. 5, in operation 501, the RU 100 may receive its compensation factor and re-compensation factor. The compensation factor and re-compensation factor of each RU may be identified in the DU 200. The DU 200 may identify the compensation factor and re-compensation factor of each RU on the basis of a location of a hop of each RU and maximum transmission capacity (or data amount) of the transmission line. The DU 200 may transmit the identified compensation factor and re-compensation factor of each identified RU to each RU through the transmission line. That is, the RU 100 may receive its compensation factor and re-compensation factor identified in the DU 200 in a wired communication manner through the transmission line.

In step 503, the RU 100 may receive an uplink signal by using the first communication unit 110. Specifically, the first communication unit 110 may include one or more antennas. The RU 100 may receive data in a wireless communication manner. That is, the RU 100 may receive uplink data from a terminal, electronic device, or the like located in a coverage area serviced by the RU 100 in a wireless communication manner by using the first communication unit 110.

In step 505, the RU 100 may receive a second signal. Specifically, the RU 100 may receive a compensated signal from a RU located in an adjacent lower-level hop. Herein, the compensation implies a computation or operation of decreasing the number of bits for representing a signal by decreasing a signal size through scaling. For example, if the RU 100 is located in an $n^{th}$ hop from the DU 200, the RU 100 may receive a compensated signal from a RU located in an $(n+1)^{th}$ hop. Herein, the compensated signal implies a signal compensated such that a signal transmitted through the transmission line does not exceed transmission capacity of the transmission line. The RU 100 may re-compensate the received second signal by using the re-compensation factor. Herein, the re-compensation factor is received from the DU 200 in step 501. The re-compensation of the signal by using the re-compensation factor implies that a compensated signal received from the RU located in the $(n+1)^{th}$ hop is restored to an original signal. As described above, the re-compensation factor of the RU located in the $n^{th}$ hop and the compensation factor of the RU located in the $(n+1)^{th}$ hop may have a reciprocal relationship. Therefore, when it is assumed that the compensation factor of the RU located in the $(n+1)^{th}$ hop is $1/S_{n+1}$, the re-compensation factor of the RU 100 located in the $n^{th}$ hop may be $S_{n+1}$, which is a reciprocal of $1/S_{n+1}$. The RU 100 may re-compensate a signal received from the lower-level hop by using the re-compensation factor $S_{n+1}$ to generate a re-compensated signal.

In operation 507, the RU 100 may generate a compensated signal to be transmitted to the RU located in the higher-level hop or the DU 200 in the 405 operation. Specifically, the RU 100 may add the first signal received in a wireless communication manner by using the first communication unit in step 503 and the signal re-compensated in step 505. Herein, the re-compensated signal implies an original signal. A size of the added signal may be estimated differently depending on a location of the hop of the RU 100. That is, the closer the location of the hop of the RU 100 to the DU, the greater the size of the added signal. This is because signals received by using the first communication unit (e.g., antenna) included in each RU may be added and accumulated in a process in which a signal is transmitted toward the DU from a RU located in a lower-level hop. Therefore, the number of valid bits of the added signals may exceed maximum transmission capacity of the transmission line. Therefore, in order to transmit the added signal to the RU located in the higher-level hop through the transmission line without distortion, the added signal must be compensated first. The compensation factor of the RU 100 is received in a wired communication manner from the DU 200 in step 501. The RU 100 may compensate the added signal by using its compensation factor. In addition, the compensated signal may be transmitted to the adjacent higher-level RU or DU through the transmission line.

In the above embodiment, it is described that the first signal is received first, and thereafter the second signal is received and re-compensated. However, this is not a limitation of the embodiment, and thus it is also possible to consider an embodiment in which the second signal is received and re-compensated first, and thereafter the first signal is received. Alternatively, it is also possible to consider an embodiment in which the RU 100 simultaneously performs an operation of receiving the first signal and an operation of receiving and re-compensating the second signal.

Figure 6:
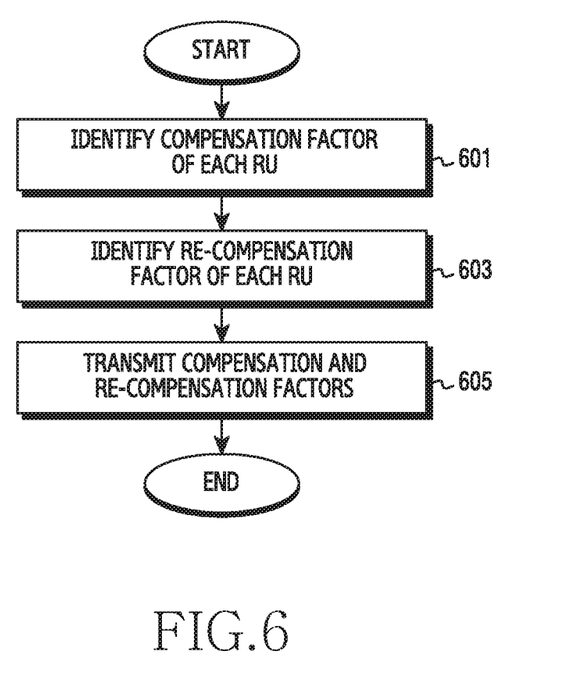
FIG. 6 is a flowchart illustrating an operation of a DU according to an embodiment of the present disclosure.

FIG. 6 is a flowchart illustrating an operation of the DU 200 according to an embodiment of the present disclosure. A plurality of RUs may be coupled to the DU 200 in a cascade chain structure. The DU 200 may perform functions such as data modulation/decoding, channel encoding/decoding, scheduling, digital signal processing, or the like. The DU 200 may constitute a base station through a connection of a cascade chain structure with respect to the plurality of RUs.

Referring to FIG. 6, in step 601, the DU 200 may identify a compensation factor of each UE located in a hop on a cascade chain. Herein, the compensation implies a computation or operation of decreasing the number of bits for representing a signal by decreasing a signal size through scaling. The DU 200 may identify the compensation factor by considering a location of each RU. For example, it may be assumed that n RUs are coupled to the DU in a cascade chain structure. A RU located in a hop closest to the DU 200 may be denoted by a RU 100-(1), and a RU located in a next hop may be denoted by a RU 100-(2). In this manner, up to a RU 100-(n) may be defined. When the compensation factor of the RU 100-(1) is $1/S_1$ and the compensation factor of the RU 100-(2) is $1/S_2$, the compensation factor of the RU 100-(n) is $1/S_n$. In a process of transmitting a signal from a RU located in a lower-level hop to a RU located in a higher-level hop, signals received by using a first communication unit included in each RU are accumulated, and thus a size of a uplink signal may gradually increase. Therefore, the compensation factor of the RU located in the higher-level hop must be smaller than the compensation factor of the RU located in the lower-level hop, such that the size of the uplink signal does not exceed maximum transmission capacity of the transmission line. That is, a compensation factor $1/S_k$ of a RU located in a $k^{th}$ hop must be less than a compensation factor $1/S_{k+1}$ of a RU located in a $(k+1)^{th}$ hop. For example, the compensation factor $1/S_1$ of the RU located in the first hop must be less than the compensation factor $1/S_2$ of the RU located in the second hop. In addition, the compensation factor $1/S_2$ of the RU located in the second hop must be less than the compensation factor $1/S_3$ of the RU located in the third hop.

The DU 200 may identify the compensation factor by considering maximum transmission capacity of the transmission line. The maximum number of transmittable bits is limited due to a physical constraint on the transmission line in charge of a connection between RUs and a wired connection between the RU and the DU. Therefore, the uplink signal size determined through Equation (1) above must not exceed the transmission capacity of the transmission line. Therefore, the maximum transmission capacity of the transmission line must be considered in order to identify the compensation factor $1/S_n$ of each RU. This may be understood in the same context as identifying of the compensation factor by considering a size of data to be transmitted.

In step 603, the DU 200 may identify each re-compensation factor of the RU on the cascade chain. Herein, the re-compensation implies a computation or operation of restoring a signal compensated in the lower-level RU to an original size. The re-compensation factor by which the RU located in each hop restores the compensated signal to its original signal. The re-compensation factor is associated with the compensation factor identified in step 601. That is, the re-compensation factor of the RU located in the $n^{th}$ hop is a reciprocal of the re-compensation factor of the RU located in the $(n+1)^{th}$ hop. This is because the RU located in the $n^{th}$ hop may be restored to an original signal by using the re-compensation factor which is a reciprocal of the compensation factor, when the RU located in the $(n+1)^{th}$ hop transmits a signal by compensating it by using the compensation factor such that it does not exceed the transmission capacity of the transmission line. The original signal may be transmitted to the DU without distortion through the compensation/re-compensation process.

The identified compensation factor and re-compensation factor of each RU may change according to a change in the number of RUs on the cascade chain. Alternatively, the identified compensation factor and re-compensation factor of each RU may change when there is a physical change of the transmission path. Alternatively, the compensation factor and the re-compensation factor may change when there is a change in an amount of data to be transmitted.

The DU 200 may transmit the compensation factor and re-compensation factor identified in steps S601 and S603 to each RU. The DU 200 may sequentially transmit to each RU the compensation factor and re-compensation factor corresponding to each RU in a wireless communication manner by using the communication unit 230. When the compensation and compensation factors of each RU change due to a change in the number of RUs on the cascade chain and/or a change in physical quantity of the transmission line or the like, the DU 200 may transmit the changed compensation factor and re-compensation factor through the transmission line.

Although it is described in the embodiment of FIG. 6 that the compensation factor is identified and thereafter the re-compensation factor is identified, this is for exemplary purposes only. Therefore, it is possible to consider an embodiment in which the re-compensation factor is first identified and then the compensation factor is identified. Alternatively, it is also possible to consider an embodiment in which the compensation factor and the re-compensation factor are identified simultaneously according to a reciprocal characteristic.

Figure 7A:
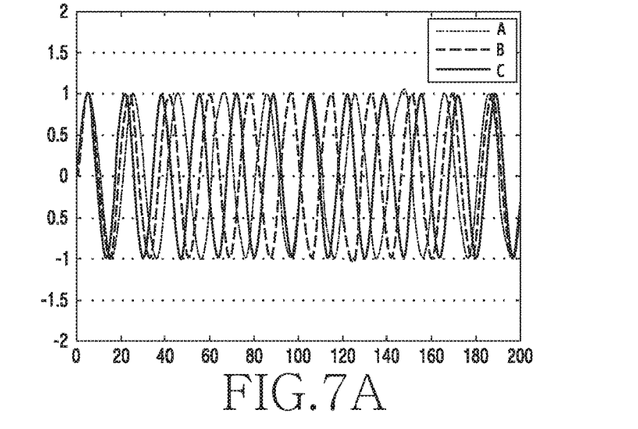
FIG. 7 is a graph illustrating an advantage according to an embodiment of the present disclosure.

FIG. 7 is a graph illustrating an advantage according to an embodiment of the present disclosure. FIG. 7A illustrates signals A, B, and C received in a first communication unit of a RU located on a cascade chain in a wireless communication manner.

Figure 7B:
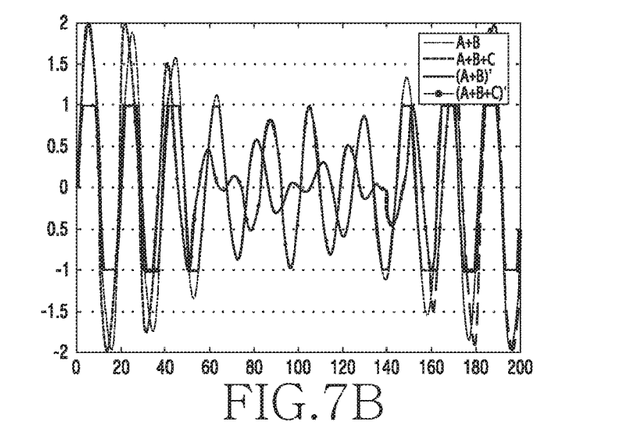

FIG. 7B illustrates a signal distortion phenomenon based on an increase in the number of bits when signals received in a first communication unit of each UE are added in a process of being transmitted to a higher-level RU through a transmission line according to the conventional technique. That is, when the number of bits increases to exceed the number of transmittable bits of the transmission line, accumulative distortion may occur in signals (A+B)' and (A+B+C)' to be transmitted, with respect to actually added signals A+B and A+B+C.

Figure 7C:
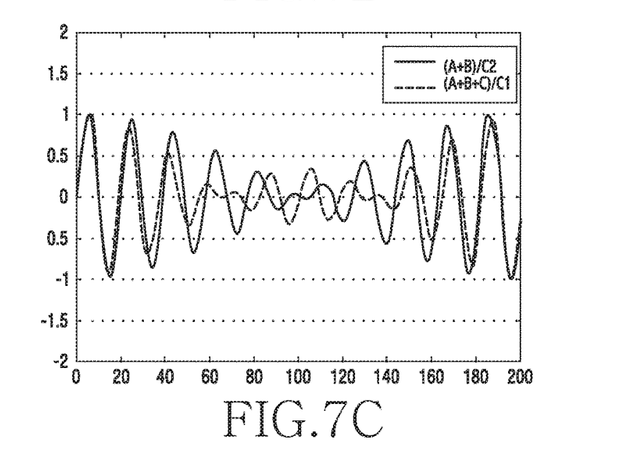

FIG. 7C illustrates an advantage when compensation and re-compensation are achieved in a process of transmitting a signal received in a first communication unit of each RU to a higher-level RU. Since an uplink signal is compensated and transmitted to the higher-level RU as shown in FIG. 7C, there is no signal distortion. In addition, since a signal transmitted from a lower-level RU is re-compensated, it is possible to transmit the signal to a higher-level entity while maintaining a specific scale factor.

Methods based on the embodiments disclosed in the claims and/or specification of the present disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the present disclosure.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can have an access to a device for performing an embodiment of the present disclosure via an external port. In addition, an additional storage device on a communication network can have an access to the device for performing the embodiment of the present disclosure.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can have an access to a device for performing an embodiment of the present disclosure via an external port. In addition, an additional storage device on a communication network can have an access to the device for performing the embodiment of the present disclosure.

While the present disclosure has been shown and described with reference to certain preferred embodiments thereof, it will be understood by those skilled in the art that various changes in form and details may be made therein without departing from the spirit and scope of the present disclosure as defined by the appended claims. Therefore, the scope of the present disclosure is defined not by the detailed description thereof but by the appended claims, and all differences within equivalents of the scope will be construed as being included in the present disclosure.

The invention claimed is:

1. A method of operating a first radio unit (RU) in a communication system, the method comprising:
receiving a first signal through an antenna;
re-compensating a second signal delivered from a second RU through a transmission line to increase a size of the second signal by using a re-compensation factor;
compensating a third signal obtained by adding the first signal and the re-compensated second signal to decrease a size of the third signal by using a compensation factor; and delivering the compensated third signal to a higher-level RU or a digital unit (DU).

2. The method of claim 1, wherein the compensation factor and the re-compensation factor are identified based on at least one of a location of the first RU on a cascade chain, the total number of RUs on the cascade chain, and maximum transmission capacity of the transmission line.

3. The method of claim 1, wherein the re-compensation factor of the first RU is a reciprocal of a compensation factor of the second RU.

4. The method of claim 1, wherein the compensation factor and the re-compensation factor are identified in the DU coupled to the RUs through the transmission line, and further comprising receiving the compensation factor and the re-compensation factor through the transmission line.

5. The method of claim 1, wherein the number of valid bits of the third signal is less than or equal to maximum transmission capacity of the transmission line.

6. The method of claim 1,
wherein the re-compensating the second signal and the compensating the third signal is based on a number of transmittable bits of the transmission line.

7. The method of claim 1,
wherein a number of bits of the second signal is equal to or less than a number of transmittable bits of the transmission line, and
wherein a number of bits of the third signal is more than the number of transmittable bits of the transmission line.

8. An apparatus for a first radio unit (RU) in a communication system, the apparatus comprising:
a transceiver; and
at least one processor operatively coupled with the transceiver,
wherein the at least one processor is configured to control to:
receive a first signal, and
re-compensate a second signal delivered from a second RU through a transmission line to increase a size of the second signal by using a re-compensation factor,
compensate a third signal obtained by adding the first signal and the re-compensated second signal to decrease a size of the third signal by using a compensation factor, and
deliver the compensated third signal to a higher-level RU or a digital unit (DU).

9. The apparatus of claim 8, wherein the compensation factor and the re-compensation factor are identified based on at least one of a location of the first RU on a cascade chain, the total number of RUs on the cascade chain, and maximum transmission capacity of the transmission line.

10. The apparatus of claim 8, wherein the re-compensation factor of the first RU is a reciprocal of a compensation factor of the second RU.

11. The apparatus of claim 8, wherein the compensation factor and the re-compensation factor are identified in the DU coupled to the RUs through the transmission line, and
wherein the at least one processor is further configured to control to receive the compensation factor and the re-compensation factor through the transmission line.

12. The apparatus of claim 8, wherein the number of valid bits of the third signal is less than or equal to maximum transmission capacity of the transmission line.

13. The apparatus of claim 8, wherein the at least one processor is further configured to:
re-compensate the second signal based on a number of transmittable bits of the transmission line, and
compensate the third signal based on a number of transmittable bits of the transmission.

14. The apparatus of claim 8,
wherein a number of bits of the second signal is equal to or less than a number of transmittable bits of the transmission line, and
wherein a number of bits of the third signal is more than a number of transmittable bits of the transmission line.

15. An apparatus for a digital unit (DU) in a communication system, the apparatus comprising:
a transceiver; and
at least one processor operatively coupled with the transceiver,
wherein the at least one processor is configured to control to:
identify a compensation factor used to decrease a size of each signal transmitted to each radio unit (RU),
identify a re-compensation factor used to increase a size of each signal received from each RU or DU corresponding to each RU on a cascade chain coupled to the DU through a transmission line, and
transmit the compensation factor and the re-compensation factor to the each RU.

16. The apparatus of claim 15, wherein the compensation factor and re-compensation factor of the each RU are identified based on at least one of a location of the each RU on a cascade chain, the total number of RUs on the cascade chain, and maximum transmission capacity of the transmission line.

17. The apparatus of claim 15, wherein the compensation factor is used to compensate an uplink signal in the each RU, and the re-compensation factor is used to re-compensate a signal delivered from the each RU through the transmission line.

18. The apparatus of claim 15, wherein the re-compensation factor of a first RU is a reciprocal of a compensation factor of a second RU.

19. The apparatus of claim 15,
wherein the compensation factor is used to decrease a number of bits of each signal transmitted to each RU based on a number of transmittable bits of the transmission line, and
wherein the re-compensation factor is used to increase a number of bits of each signal received from each RU or DU based on a number of transmittable bits of the transmission line.

20. The apparatus of claim 15,
wherein a number of bits of each signal transmitted to each RU is equal to or less than a number of transmittable bits of the transmission line, and
wherein a number of bits of each signal received from each RU or DU is more than a number of transmittable bits of the transmission line.

* * * * *